United States Patent
Katayama

(10) Patent No.: US 8,761,820 B2
(45) Date of Patent: Jun. 24, 2014

(54) RADIO BASE STATION, RADIO RESOURCE ALLOCATION METHOD AND RADIO COMMUNICATION SYSTEM

(75) Inventor: Masahide Katayama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 428 days.

(21) Appl. No.: 13/263,436

(22) PCT Filed: Mar. 30, 2010

(86) PCT No.: PCT/JP2010/002335
§ 371 (c)(1),
(2), (4) Date: Oct. 7, 2011

(87) PCT Pub. No.: WO2010/116688
PCT Pub. Date: Oct. 14, 2010

(65) Prior Publication Data
US 2012/0046060 A1 Feb. 23, 2012

(30) Foreign Application Priority Data

Apr. 9, 2009 (JP) .................................. 2009-095212
Oct. 28, 2009 (JP) .................................. 2009-248140

(51) Int. Cl.
*H04B 7/00* (2006.01)
*H04W 64/00* (2009.01)
*H04W 72/04* (2009.01)
*H04W 4/00* (2009.01)

(52) U.S. Cl.
CPC ............ *H04W 64/006* (2013.01); *H04W 72/04* (2013.01); *H04W 4/00* (2013.01)
USPC ........... 455/513; 455/509; 455/512; 455/511; 455/67.11; 455/507; 370/328; 370/329; 370/343; 370/338; 370/310

(58) Field of Classification Search
CPC ... H04W 64/006; H04W 72/04; H04W 24/00; H04W 72/082
USPC ......... 455/513, 511, 509, 500, 517, 512, 514, 455/67.11, 504, 506, 445, 550.1, 422.1, 455/403, 434, 450, 441, 423–425, 507, 515, 455/561, 571.1; 370/328, 329, 343, 338, 370/310
See application file for complete search history.

(56) References Cited

U.S. PATENT DOCUMENTS 7,822,132 B2   10/2010   Futaki et al.
2007/0004465 A1*   1/2007   Papasakellariou et al. ... 455/571
(Continued)

FOREIGN PATENT DOCUMENTS

JP   2003-518812 A   6/2003
JP   2006-237897 A   9/2006
(Continued)

OTHER PUBLICATIONS

"3rd Generation Partnership Project; Technical Specification Group Ratio Access Network; Physical layer aspects for evolved Universal Terrestrial Radio Access (UTRA)(Release 7)"; 3GPP TR 25.814; V7.1.0 (Sep. 2006).
(Continued)

*Primary Examiner* — Keith Ferguson
(74) *Attorney, Agent, or Firm* — Studebaker & Brackett PC

(57) ABSTRACT

A radio base station for performing radio communication by allocating a different radio resource to each of a plurality of radio terminals has a measurement unit for measuring a path loss on the radio resource, a difference information obtaining unit for obtaining difference information Ph between maximum transmit power and current transmit power, a communication type information obtaining unit for obtaining communication type information indicative of a communication type of each of the radio terminals, and a control unit for classifying the radio resources into at least two radio resource groups based on the path loss on each of the radio resources, and for controlling to allocate a radio resource in a corresponding radio resource group to each of the radio terminals based on the difference information and the communication type information obtained. Thereby, the transmit power of a plurality of radio terminals is suitably controlled and a stable radio link is maintained.

16 Claims, 9 Drawing Sheets

(56) References Cited

U.S. PATENT DOCUMENTS

| | | |
|---|---|---|
| 2008/0152028 A1 | 6/2008 | Futaki et al. |
| 2009/0207803 A1* | 8/2009 | Kawamura et al. ........... 370/330 |
| 2010/0246559 A1 | 9/2010 | Ogawa et al. |
| 2011/0002282 A1 | 1/2011 | Inoue et al. |
| 2012/0281665 A1 | 11/2012 | Inoue et al. |

FOREIGN PATENT DOCUMENTS

| | | |
|---|---|---|
| JP | 2007-336498 A | 12/2007 |
| WO | 2006/049123 A1 | 5/2006 |
| WO | 2007119591 A1 | 10/2007 |
| WO | 2009/116562 A1 | 9/2009 |

OTHER PUBLICATIONS

International Search Report; PCT/JP2010/002335; Jun. 29, 2010.
An Office Action 'Notification of Reasons for Refusal' issued by the Japanese Patent Office dated Jun. 18, 2013, which corresponds to Japanese Patent Application No. 2009-248140 and is related to U.S. Appl. No. 13/263,436; with translation.

* cited by examiner

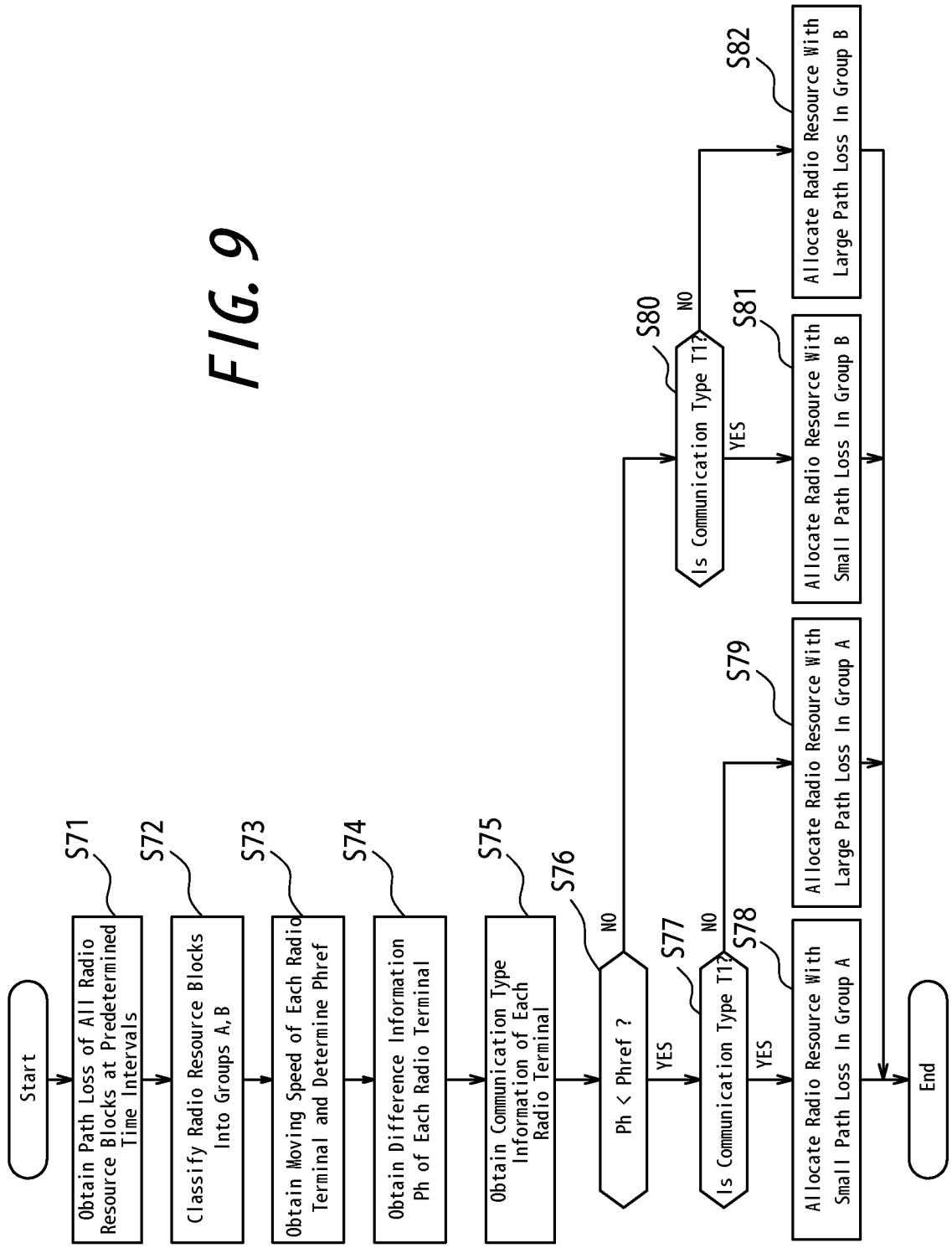

RADIO BASE STATION, RADIO RESOURCE ALLOCATION METHOD AND RADIO COMMUNICATION SYSTEM

CROSS REFERENCE TO RELATED APPLICATION

This application claims priority to and the benefit of Japanese Patent Application No. 2009-95212 filed on Apr. 9, 2009 and Japanese Patent Application No. 2009-248140 filed on Oct. 28, 2009, the entire contents of which are incorporated herein by reference.

TECHNICAL FIELD

The present invention relates to radio base stations, radio resource allocation methods and radio communication systems.

BACKGROUND ART

There is a conventional radio communication system in which a radio terminal transmits scheduling information including a data size to be transmitted and difference information Ph (Power Headroom) between the maximum transmit power the radio terminal can transmit and the current transmit power to the radio base station. The radio base station is known to determine transmit power of the radio terminal based on the scheduling information and to perform scheduling to control a transmission data rate.

In addition, it is recently promoted to standardize LTE (Long Term Evolution) by 3GPP (3rd Generation Partnership Project), for example. In LTE, a transmission bandwidth (resource block) having a plurality of sub carriers is allocated as an uplink radio resource (for example, see Non-Patent Document 1). Accordingly, in LTE also, similarly to the conventional radio communication system, the radio base station determines the transmit power of the radio terminal based on the scheduling information including the difference information Ph transmitted from the radio terminal and performs scheduling to control the transmission data rate.

PRIOR ART DOCUMENT

Non-Patent Document

Non-Patent Document 1: 3GPP TR25.814

SUMMARY OF INVENTION

Technical Problem

Now, in the radio communication system which performs communication by allocating a radio resource at a different frequency to each of a plurality of radio terminals, a radio condition of each of the radio resources varies every second under influence of frequency selective fading. Accordingly, there may be both radio resources in good radio conditions and radio resources in poor radio conditions in the radio communication system together. In this case, for a radio terminal using a radio resource with a deteriorated radio condition, it is possible to ensure a desired communication quality by determining the transmit power based on the difference information Ph transmitted from the radio terminal and performing scheduling to control the transmission data rate, as described above.

However, in case where a radio terminal has no room to increase transmit power, and if the radio condition of the radio resource allocated to the radio terminal becomes even worse, it is no longer possible to control to increase the transmit power. In this case, the radio terminal has a difficulty in maintaining a radio link with the radio base station. In contrast, a radio terminal using the radio resources in good radio condition generally has room to increase the transmit power.

As described above, in the radio communication system which performs a communication by allocating a different radio resource at a different frequency to each of a plurality of radio terminals, despite the control of the transmit power by the radio base station based on the difference information Ph transmitted from the radio terminal, some radio terminals may have a difficulty in keeping the radio link with the radio base station due to no room to increase the transmit power.

Accordingly, an object of the present invention in consideration of such problem is to provide radio base stations, radio resource allocation methods and radio communication systems capable of suitably controlling the transmit power of a plurality of radio terminals and maintaining stable radio links.

Solution to Problem

In order to achieve the above object, according to a first aspect of the present invention, a radio base station for performing radio communication by allocating a different radio resource to each of a plurality of radio terminals includes:

a measurement unit for measuring a path loss on the radio resource allocated to each of the plurality of radio terminals at predetermined time intervals;

a difference information obtaining unit for obtaining difference information between maximum transmit power and current transmit power, transmitted from each of the plurality of radio terminals;

a communication type information obtaining unit for obtaining communication type information indicative of a communication type of each of the plurality of radio terminals; and a control unit for classifying the radio resources into at least two radio resource groups based on the path loss on each of the radio resources measured by the measurement unit, and for controlling to allocate a radio resource in a corresponding radio resource group to each of the plurality of radio terminals based on the difference information obtained by the difference information obtaining unit and the communication type information obtained by the communication type information obtaining unit.

According to a second aspect of the present invention, in the radio base station of the first aspect, the control unit classifies the radio resources into at least two radio resource groups based on a comparison between the path loss on each of the radio resources measured by the measurement unit and a predetermined threshold.

According to a third aspect of the present invention, in the radio base station of the first aspect, the control unit, after determining the radio resource group to allocate a radio resource to each of the radio terminals, based on the difference information obtained by the difference information obtaining unit, controls to allocate a radio resource with a relatively large path loss or a radio resource with a relatively small path loss measured by the measurement unit in the radio resource group determined, based on the communication type information obtained by the communication type information obtaining unit.

According to a fourth aspect of the present invention, in the radio base station of the first aspect, the control unit, after determining the radio resource group to allocate a radio resource to each of the radio terminal, based on the communication type information obtained by the communication type information obtaining unit, controls to allocate a radio resource with a relatively large path loss or a radio resource with a relatively small path loss measured by the measurement unit in the radio resource group determined, based on the difference information obtained by the difference information obtaining unit.

Moreover, in order to achieve the above object, according to a fifth aspect of the present invention, a radio base station for performing radio communication by allocating a different radio resource to each of a plurality of radio terminals includes:

a measurement unit for measuring a path loss on the radio resource allocated to each of the plurality of radio terminals at predetermined time intervals;

a difference information obtaining unit for obtaining difference information between maximum transmit power and current transmit power, transmitted from each of the plurality of radio terminals;

a moving speed obtaining unit for obtaining a moving speed of each of the plurality of radio terminals; and a control unit for setting a radio resource allocation reference in accordance with the moving speed obtained by the moving speed obtaining unit for each of the radio terminals, and for controlling allocation of the radio resource to each of the plurality of radio terminals based on the radio resource allocation reference, the path loss measured by the measurement unit and the difference information obtained by the difference information obtaining unit.

According to a sixth aspect of the present invention, in the radio base station of the fifth aspect, the moving speed obtaining unit obtains the moving speed of the radio terminal based on a received signal from the radio terminal.

According to a seventh aspect of the present invention, in the radio base station of the fifth aspect, the control unit allocates a radio resource with a relatively small path loss measured by the measurement unit to the radio terminal having the difference information obtained by the difference information obtaining unit under a first threshold indicative of the radio resource allocation reference set for each of the radio terminals, whereas the control unit allocates a radio resource with a relatively large path loss measured by the measurement unit to the radio terminal having the difference information obtained by the difference information obtaining unit equal to or over the first threshold indicative of the radio resource allocation reference set for each of the radio terminals.

According to an eighth aspect of the present invention, the radio base station of the fifth aspect, further includes a communication type information obtaining unit for obtaining communication type information indicative of a communication type of each of the plurality of radio terminals, wherein the control unit controls allocation of the radio resource to each of the plurality of radio terminals based on the path loss measured by the measurement unit, the difference information obtained by the difference information obtaining unit, the radio resource allocation reference set for each of the radio terminals, and the communication type information obtained by the communication type information obtaining unit.

According to a ninth aspect of the present invention, in the radio base station of the eighth aspect, the control unit classifies the radio resources into at least two radio resource groups based on the path loss on each of the radio resources measured by the measurement unit, and controls to allocate a radio resource in a corresponding radio resource group to each of the plurality of radio terminals, based on the radio resource allocation reference set for each of the radio terminals, the difference information obtained by the difference information obtaining unit and the communication type information obtained by the communication type information obtaining unit.

According to a tenth aspect of the present invention, in the radio base station of the ninth aspect, the control unit classifies the radio resources into at least two radio resource groups based on a comparison of the path loss on each of the radio resources measured by the measurement unit and a predetermined second threshold.

According to an eleventh aspect of the present invention, in the radio base station of the ninth aspect, the control unit, after determining the radio resource group to allocate a radio resource to each of the radio terminals, based on the radio resource allocation reference set for each of the radio terminals and the difference information obtained by the difference information obtaining unit, controls to allocate a radio resource with a relatively large path loss or a radio resource with a relatively small path loss measured by the measurement unit in the radio resource group determined, based on the communication type information obtained by the communication type information obtaining unit.

According to a twelfth aspect of the present invention, in the radio base station of the ninth aspect, the control unit, after determining the radio resource group to allocate a radio resource to each of the radio terminals, based on the communication type information obtained by the communication type information obtaining unit, controls to allocate a radio resource with a relatively large path loss or a radio resource with a relatively small path loss measured by the measurement unit in the radio resource group determined, based on the radio resource allocation reference set for each of the radio terminals and the difference information obtained by the difference information obtaining unit.

Moreover, in order to achieve the above object, according to a thirteenth aspect of the present invention, a radio resource allocation method of a radio base station for performing radio communication by allocating a different radio resource to each of a plurality of radio terminals includes the steps of:

measuring a path loss on the radio resource allocated to each of the plurality of radio terminals at predetermined time intervals;

obtaining difference information between maximum transmit power and current transmit power, transmitted from each of the plurality of radio terminals;

obtaining communication type information indicative of a communication type of each of the plurality of radio terminals; and classifying the radio resources into at least two radio resource groups based on the path loss on each of the radio resources measured, and controlling to allocate a radio resource in a corresponding radio resource group to each of the plurality of radio terminals based on the difference information and the communication type information obtained.

In order to achieve the above object, according to a fourteenth aspect of the present invention, a radio resource allocation method of a radio base station for performing radio communication by allocating a different radio resource to each of a plurality of radio terminals includes the steps of:

measuring a path loss on the radio resource allocated to each of the plurality of radio terminals at predetermined time intervals;

obtaining difference information between maximum transmit power and current transmit power, transmitted from each of the plurality of radio terminals;

obtaining a moving speed of each of the plurality of radio terminals; and setting a radio resource allocation reference in accordance with the moving speed obtained by the moving speed obtaining unit for each of the radio terminals and for controlling allocation of the radio resource to each of the plurality of radio terminals based on the radio resource allocation reference, the path loss measured by the measurement unit and the difference information obtained by the difference information obtaining unit.

Further, in order to achieve the above object, according to a fifteenth aspect of the present invention, a radio communication system comprises a radio base station for performing radio communication with a plurality of radio terminals by allocating a different radio resource to each of the plurality of radio terminals, wherein each of the plurality of radio terminals includes:

a calculation unit for calculating a difference between current transmit power and maximum transmit power the radio terminal can transmit and for outputting difference information;

a transmission unit for transmitting the difference information output from the calculation unit to the radio base station, and the radio base station includes:

a measurement unit for measuring a path loss on the radio resource allocated to each of the plurality of radio terminals at predetermined time intervals;

a difference information obtaining unit for obtaining the difference information between maximum transmit power and current transmit power, transmitted from each of the plurality of radio terminals;

a communication type information obtaining unit for obtaining communication type information indicative of a communication type of each of the plurality of radio terminals; and a control unit for classifying the radio resources into at least two radio resource groups based on the path loss on each of the radio resources measured by the measurement unit, and for controlling to allocate a radio resource in a corresponding radio resource group to each of the plurality of radio terminals based on the difference information obtained by the difference information obtaining unit and the communication type information obtained by the communication type information obtaining unit.

Moreover, in order to achieve the above object, according to a sixteenth aspect of the present invention, a radio communication system comprises a radio base station for performing radio communication with a plurality of radio terminals by allocating a different radio resource to each of the plurality of radio terminals, wherein each of the plurality of radio terminals includes:

a calculation unit for calculating a difference between current transmit power and maximum transmit power the radio terminal can transmit and for outputting difference information;

a transmission unit for transmitting the difference information output from the calculation unit to the radio base station, and the radio base station includes:

a measurement unit for measuring a path loss on the radio resource allocated to each of the plurality of radio terminals at predetermined time intervals;

a difference information obtaining unit for obtaining the difference information between maximum transmit power and current transmit power, transmitted from each of the plurality of radio terminals;

a moving speed obtaining unit for obtaining a moving speed of each of the plurality of radio terminals; and a control unit for setting a radio resource allocation reference in accordance with the moving speed obtained by the moving speed obtaining unit for each of the radio terminals, and for controlling allocation of the radio resource to each of the plurality of radio terminals based on the radio resource allocation reference, the path loss measured by the measurement unit and the difference information obtained by the difference information obtaining unit.

Effect of the Invention

According to the present invention, the radio base station measures path states of a plurality of radio resources at predetermined time intervals, classifies the radio resources into two or more radio resource groups based on the path states, and then controls to allocate a radio resource in a corresponding radio resource group to each of the radio terminals based on the difference information and the communication type information obtained. It is thus possible to suitably control the transmit power of the plurality of radio terminals and to maintain a stable radio link between each of the radio terminals and the radio base station.

According to the present invention, further, the radio base station obtains the moving speed of each of the radio terminals and sets the radio resource allocation reference in accordance with the moving speed obtained for each of the radio terminals, as well as measuring the path states of the radio resources at predetermined time intervals and obtaining the difference information between the maximum transmit power and the current transmit power from each of the radio terminals, and then controls allocation of the radio resources to the plurality of radio terminals based on the radio resource allocation reference set, the path states measured and the difference information obtained. It is thus possible to suitably control the transmit power of the plurality of radio terminals and to maintain a stable radio link between each of the radio terminals and the radio base station.

BRIEF DESCRIPTION OF DRAWINGS

FIG. 9 is a flowchart illustrating a scheduling operation to allocate the radio resource blocks by a radio base station according to a fifth embodiment of the present invention.

DESCRIPTION OF EMBODIMENTS

Embodiments of the present invention will be described with reference to the accompanying drawings.

First Embodiment

Figure 1:
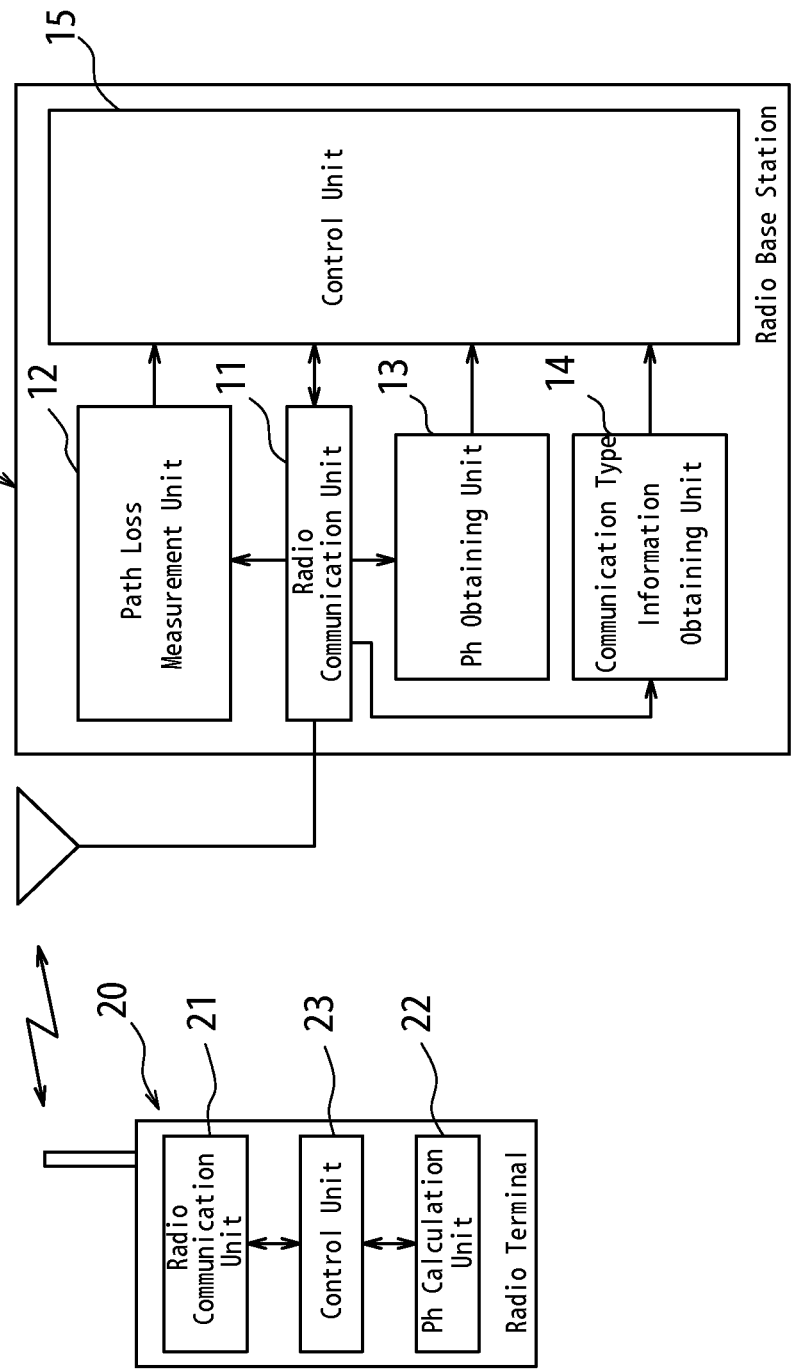
FIG. 1 is a diagram illustrating a schematic configuration of a radio communication system having a radio base station according to a first embodiment of the present invention.

FIG. 1 is a diagram illustrating a schematic configuration of a radio communication system having a radio base station according to a first embodiment of the present invention. This radio communication system conforms to LTE, for example, and a radio base station 10 of the present embodiment performs radio communications with a plurality of radio terminals 20 by allocating different radio resource blocks to respective radio terminals 20 (only one of which is shown in FIG. 1).

The radio base station 10 has a radio communication unit 11, a path loss measurement unit 12, a Ph obtaining unit 13, a communication type information obtaining unit 14 and a control unit 15. The radio communication unit 11 performs the radio communications with a plurality of radio terminals 20. The path loss measurement unit 12, at predetermined time intervals, measures the path loss on each of the radio resource blocks allocated to the radio terminals 20 based on a received signal from the radio communication unit 11 and provides a result of measurement to the control unit 15.

Here, the predetermined time interval to measure the path loss is a processing unit time specified by the system, such as a sub frame (1 ms) of a radio frame, for example. In addition, the path loss is measured based on, for example, received electric field intensity or a packet loss on each of the radio resource blocks.

The Ph obtaining unit 13 constitutes a difference information obtaining unit, and based on the received signal from the radio communication unit 11, obtains difference information Ph (Power Headroom) between the maximum transmit power and the current transmit power transmitted from each of the radio terminals 20. The Ph obtaining unit 13 then provides the control unit 15 with the difference information Ph obtained.

The communication type information obtaining unit 14 obtains communication type information by identifying a type of the communication with each of the radio terminals 20 and provides the control unit 15 with the communication type information. According to the present embodiment, the communication type information obtaining unit 14 classifies the communication type information into a communication type (T1) requiring a real-time property such as for example voice communication, streaming and the like and a communication type (T2) for other data communications such as browsing and the like, and provides the control unit 15 with the communication type information.

The control unit 15 controls operations of an overall radio base station. In addition, the control unit 15, at the predetermined time intervals, controls (schedules) allocation of the radio resource blocks to a plurality of radio terminals 20 based on the path loss measured by the path loss measurement unit 12, the difference information Ph obtained by the Ph obtaining unit 13, and the communication type information obtained by the communication type information obtaining unit 14. Further, the control unit 15 transmits a result of such scheduling to corresponding radio terminals 20 via the radio communication unit 11.

The radio base station 10 may have a single CPU (Central Processing Unit) to implement the path loss measurement unit 12, the Ph obtaining unit 13, the communication type information obtaining unit 14 and the control unit 15. Alternatively, the radio base station 10 may have a plurality of CPUs to assign functions of the path loss measurement unit 12, the Ph obtaining unit 13, the communication type information obtaining unit 14 and the control unit 15.

Meanwhile, each of the radio terminals 20 includes a radio communication unit 21, a Ph calculation unit 22 and a control unit 23. The radio communication unit 21 includes a transmission unit and a reception unit for performing communication with the radio base station 10 by using the radio resource blocks allocated. The Ph calculation unit 22 calculates a difference between the maximum transmit power the radio terminal 20 can transmit and the current transmit power and provides the control unit 23 with the difference information Ph. The control unit 23 controls operations of an overall radio terminal. The control unit 23, either periodically or on a request basis from the radio base station 10, transmits (notifies) the difference information Ph obtained from the Ph calculation unit 22 to the radio base station 10 via the radio communication unit 21.

Figure 2:
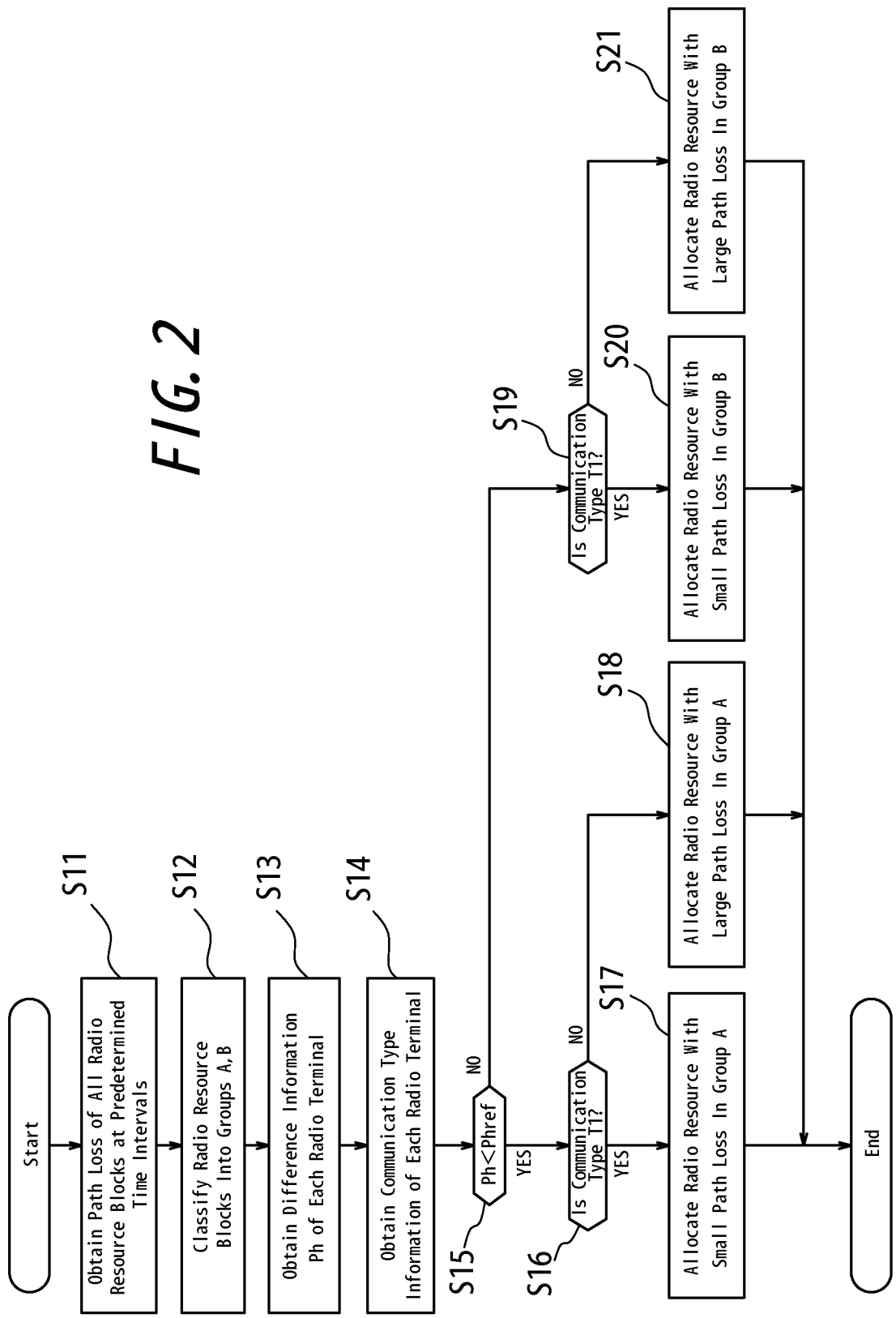
FIG. 2 is a flowchart illustrating a scheduling operation to allocate radio resource blocks by the radio base station shown in FIG. 1.

FIG. 2 is a flowchart illustrating a scheduling operation to allocate the radio resource blocks by the radio base station 10 according to the present embodiment. The control unit 15 obtains path losses of all of the radio resource blocks from the path loss measurement unit 12 at the predetermined time intervals (step S11). Then, the control unit 15 classifies the radio resource blocks into a plurality of radio resource groups based on a comparison between the path loss on each of the radio resource blocks obtained and a predetermined threshold. According to the present embodiment, the radio resource blocks are classified into two radio resource groups by the threshold of the path loss: group A with a path loss under the threshold, i.e., being in a good radio condition, and group B with a path loss equal to or over the threshold, i.e., being in a relatively poor radio condition (step S12).

The control unit 15 obtains, at the predetermined time intervals, the difference information Ph of each of the radio terminals 20 from the Ph obtaining unit 13 (step S13) and the communication type information of each of the radio terminals 20 classified from the communication type information obtaining unit 14 (step S14).

Then, the control unit 15 compares, for each of the radio terminals 20, the difference information Ph of a radio terminal 20 and a predetermined threshold Phref (step S15). If Ph<Phref as a result, since the radio terminal 20 does not have room to increase transmit power, the control unit 15 determines whether the communication type of the radio terminal 20 is the communication type T1 requiring the real-time property (step S16).

If the communication type is T1, the control unit 15 schedules allocation of radio resource blocks such that the radio terminal 20 is allocated a radio resource block with a smaller path loss preferentially among radio resource blocks in the group A (step S17). The control unit 15 then transmits a result of such scheduling to the corresponding radio terminal 20.

In contrast, if the communication type is T2, which does not require the real-time property, the control unit 15 schedules allocation of radio resource blocks such that the radio terminal 20 is allocated a radio resource block with a larger path loss among radio resource blocks in the group A (step S18). The control unit 15 then transmits a result of such scheduling to the corresponding radio terminal 20.

If Ph≥Phref at step S15, since the radio terminal 20 has room to increase the transmit power, the control unit 15 determines whether the communication type is T1 (step S19). If the communication type is T1, the control unit 15 schedules allocation of radio resource blocks such that the radio terminal 20 is allocated the radio resource block with a smaller path loss preferentially among radio resource blocks in the group B (step S20). The control unit 15 then transmits a result of such scheduling to the corresponding radio terminal 20.

In contrast, if the communication type is T2, the control unit 15 schedules allocation of radio resource blocks such that the radio terminal 20 is allocated a radio resource block with a larger path loss among radio resource blocks in the group B (step S21). The control unit 15 then transmits a result of such scheduling to the corresponding radio terminal 20.

As described above, the control unit 15, at predetermined time intervals, schedules the radio resource blocks allocated to respective radio terminals 20 in accordance with the radio conditions of the radio resource blocks varying every second, based on the radio condition of each of the radio resource blocks and the difference information Ph and the communication type of each of the radio terminals.

Figure 3:
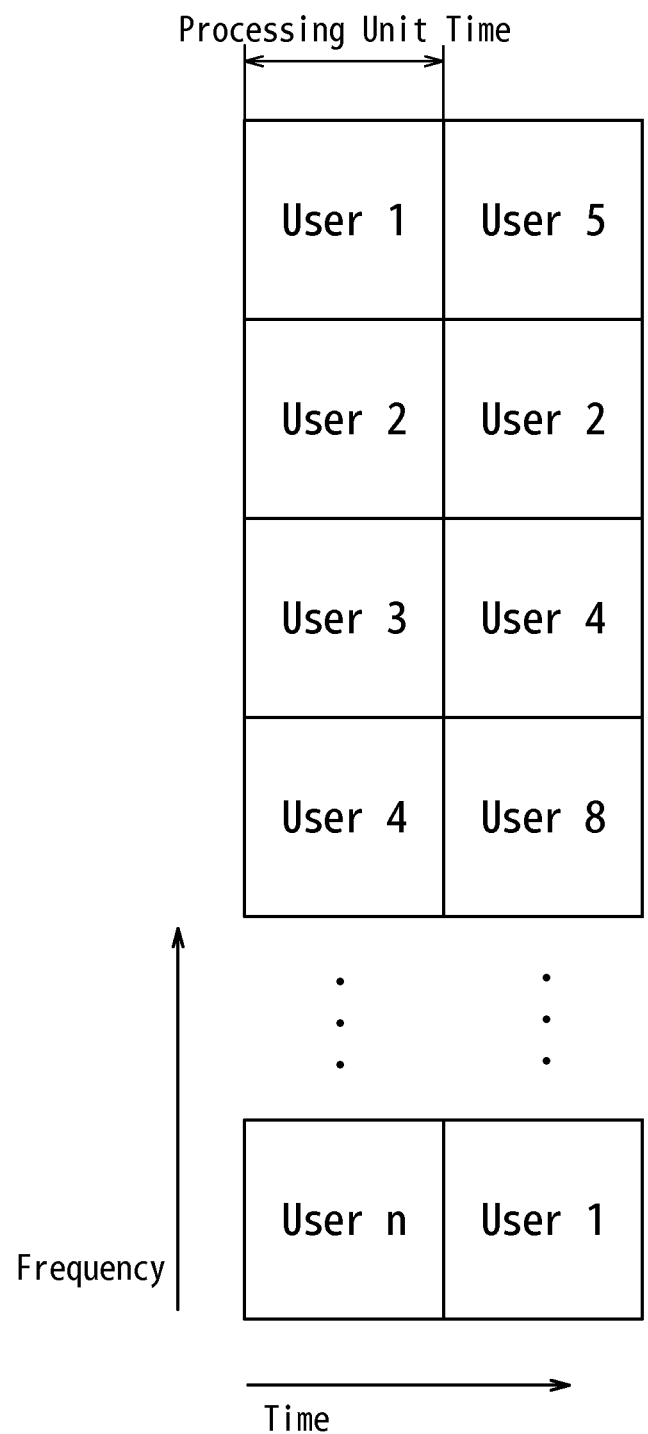
FIG. 3 is a frame format illustrating allocation of the radio resource blocks by the radio base station shown in FIG. 1.

FIG. 3 is a frame format illustrating allocation of the radio resource blocks by the radio base station 10 according to the present embodiment. In FIG. 3, a horizontal axis and a vertical axis represent time and a frequency, respectively. The processing unit time corresponds to the predetermined time interval to schedule allocation of the radio resource blocks. As shown in FIG. 3, allocation of the radio resource blocks to a plurality of radio terminals denoted by a user 1 to a user n is changed at the processing unit time (predetermined time interval) in series based on the radio condition of each of the radio resource blocks and the difference information Ph and the communication type of each of the radio terminals. It is appreciated that, although one radio resource block is allocated to each user (radio terminal) in FIG. 3, it may schedule to allocate a plurality of radio resource blocks to one radio terminal if a small number of radio terminals are connected.

According to the radio communication system having the radio base station 10 of the present embodiment, the radio resource block in the group A which has a small path loss, i.e., the radio resource block in a good radio condition is selected for the radio terminal 20 having no room to increase transmit power, i.e., having the difference information Ph under the threshold Phref. In addition, the radio terminal 20 in communication of the communication type T1 which requires the real-time property is preferentially allocated a radio resource block with a smaller path loss in the group A, i.e., the radio resource block in a better radio condition. Therefore, it enables the radio terminal 20 in communication of the communication type T1 to keep a more stable radio link, ensuring QoS (Quality of Service) of the communication type T1.

In contrast, the radio resource block in the group B which has a large path loss, i.e., the radio resource block in a poor radio condition is selected for the radio terminal 20 having the difference information Ph exceeding the threshold Phref. However, it has room to increase transmit power, the radio terminal 20 can keep the radio link by suitably controlling the transmit power. Moreover, even in this case, the radio terminal 20 in communication of the communication type T1 which requires the real-time property is preferentially allocated a radio resource block with a smaller path loss in the group B, i.e., a radio resource block in a better radio condition. It thus more stably ensures QoS of the communication type T1.

As described above, the radio communication system having the radio base station 10 according to the present embodiment enables to suitably control the transmit power of each of the radio terminals 20 and to keep a stable radio link between each of the radio terminals 20 and the radio base station 10. In addition, since the radio base station 10 can know path losses of all of the radio resource blocks at predetermined time intervals, it can control a downlink modulation method, beam forming of an antenna and the like, following temporal changes in the radio condition.

Second Embodiment

A radio base station according to a second embodiment of the present invention has a configuration shown in FIG. 1 and schedules allocation of radio resource blocks such that the radio terminal 20 of the communication type T1 requiring the real-time property is allocated a radio resource block in the group A which has a small path loss.

Figure 4:
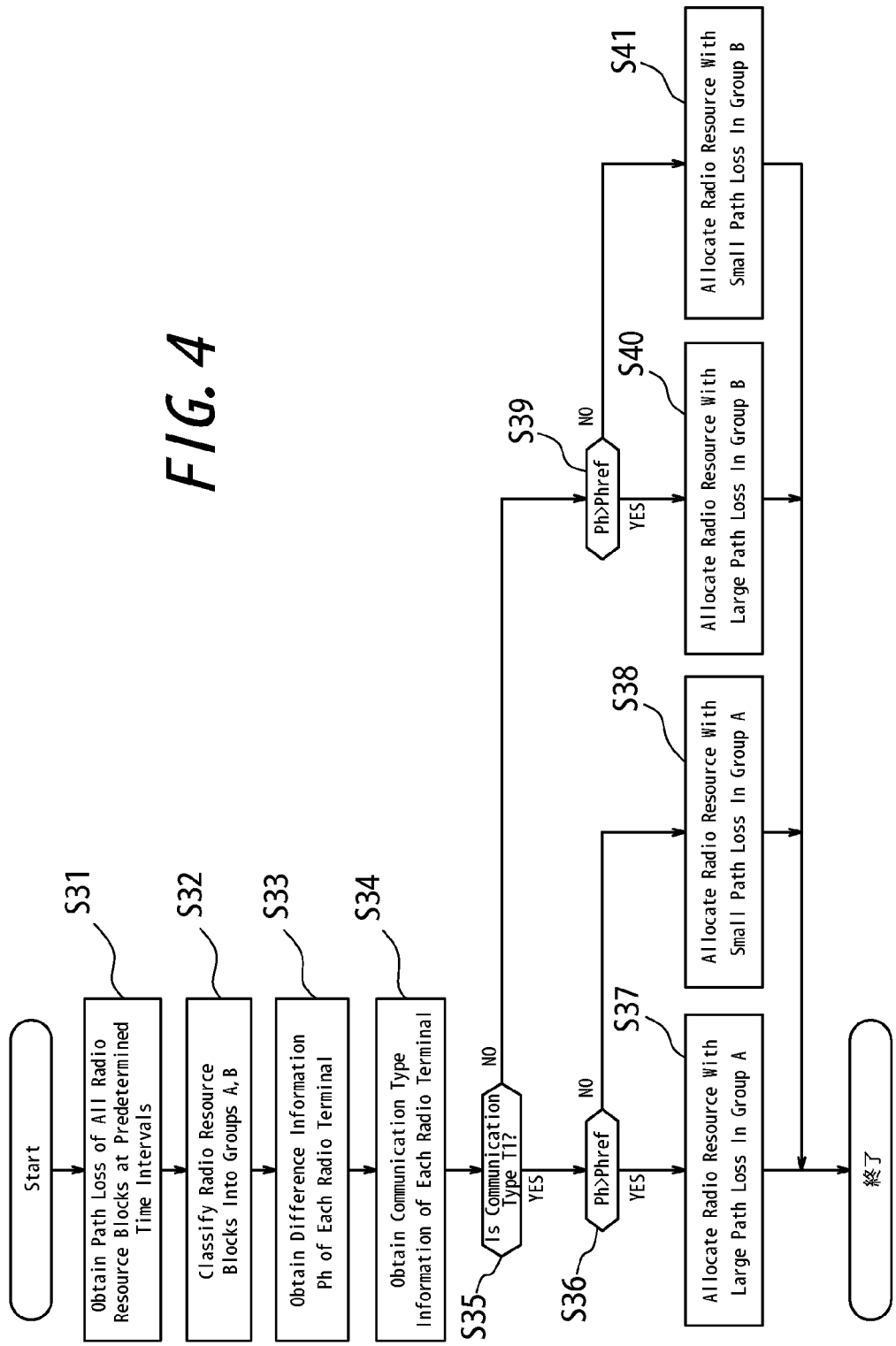
FIG. 4 is a flowchart illustrating a scheduling operation to allocate the radio resource blocks by a radio base station according to a second embodiment of the present invention.

FIG. 4 is a flowchart illustrating a scheduling operation to allocate the radio resource blocks by the radio base station according to the present embodiment. The following is a description of the operation with reference to FIG. 1. The control unit 15, in the same manner as the first embodiment, obtains path losses of all of the radio resource blocks from the path loss measurement unit 12 at predetermined time intervals (step S31). Then, the control unit 15 classifies the radio resource blocks into a plurality of radio resource groups based on the path loss on each of the radio resource blocks obtained and a predetermined threshold of the path loss. According to the present embodiment, the radio resource blocks are classified into two radio resource groups by the threshold of the path loss: group A with a path loss under the threshold in a good radio condition, and group B with a path loss equal to or over the threshold in a relatively poor radio condition (step S32).

The control unit 15 obtains, at the predetermined time intervals, the difference information Ph of each of the radio terminals 20 from the Ph obtaining unit 13 (step S33) and the communication type information of each of the radio terminals 20 classified by the communication type information obtaining unit 14 (step S34).

Then, the control unit 15, contrary to the first embodiment, first determines whether the communication type of each of the radio terminals 20 is the communication type T1 which requires the real-time property (step S35). In case of the communication type T1, the control unit 15 compares the difference information Ph of the radio terminal 20 and the predetermined threshold Phref in order to keep the radio link stably (step S36).

If Ph>Phref as a result, since the radio terminal 20 has room to increase transmit power, the control unit 15 schedules allocation of radio resource blocks such that the radio terminal 20 is allocated a radio resource block with a larger path loss among radio resource blocks in the group A with small path losses (step S37). The control unit 15 then transmits a result of such scheduling to the corresponding radio terminal 20.

In contrast, if Ph≤Phref, since the radio terminal 20 does not have room to increase transmit power, the control unit 15 schedules allocation of radio resource blocks such that the radio terminal 20 is allocated a radio resource block with a smaller path loss preferentially among radio resource blocks in the group A (step S38). The control unit 15 then transmits a result of such scheduling to the corresponding radio terminal 20.

If it is determined at step S35 that the communication type is the communication type T2 which does not require the real-time property, the control unit 15 compares the difference information Ph and the threshold Phref (step S39). If Ph>Phref as a result, the control unit 15 schedules allocation of radio resource blocks such that the radio terminal 20 is allocated a radio resource block with a larger path loss among radio resource blocks in the group B (step S40). The control unit 15 then transmits a result of such scheduling to the corresponding radio terminal 20.

If Ph≤Phref, the control unit 15 schedules allocation of radio resource blocks such that the radio terminal 20 is allocated a radio resource block with a smaller path loss preferentially among radio resource blocks in the group B (step S41). The control unit 15 then transmits a result of such scheduling to the corresponding radio terminal 20.

As described above, the control unit 15, at predetermined time intervals, schedules the radio resource blocks allocated to respective radio terminals 20 in accordance with the radio conditions of the radio resource blocks varying every second, based on the radio condition of each of the radio resource blocks and the communication type and the difference information Ph of each of the radio terminals 20.

According to the radio communication system having the radio base station 10 of the present embodiment, the radio resource block in the group A which has a small path loss, i.e., being in a good radio condition is selected for the radio terminal 20 in communication of the communication type T1 which requires the real-time property. Thereby, it can ensure QoS of each of the communication types. In addition, in case of the communication type T1 and satisfying Ph≤Phref, the radio terminal 20 is allocated a radio resource block with a smaller path loss preferentially among radio resource blocks in the group A. Accordingly, in the same manner as the first embodiment, it is possible to keep a stable radio link for the radio terminal 20 in communication of the communication type T1, thus ensuring QoS of the communication type T1.

Meanwhile, the radio resource blocks in the group B are selected for the radio terminals 20 in communication of the communication type T2. In addition, a radio resource block with a smaller path loss among radio resource blocks in the group B is allocated to the radio terminal 20 having the difference information Ph equal to or under the threshold Phref, i.e., the terminal with no room to increase transmit power. In contrast, a radio resource block with a larger path loss among radio resource blocks in the group B is allocated to the radio terminal 20 having the difference information Ph exceeding the threshold Phref, i.e., the terminal with room to increase transmit power. Thereby, it is possible for the radio terminal 20 in communication of the communication type T2 to keep a stable radio link.

Accordingly, in the same manner as the radio communication system having the radio base station 10 according to the first embodiment, the communication system according to the present embodiment enables to suitably control the transmit power of each of the radio terminals 20 and to keep a stable radio link between each of the radio terminals 20 and the radio base station 10. In addition, since the radio base station 10 can know path losses of all of the radio resource blocks at the predetermined time intervals, it can control a downlink modulation method, beam forming of an antenna and the like, following temporal changes in the radio condition.

Third Embodiment

Figure 5:
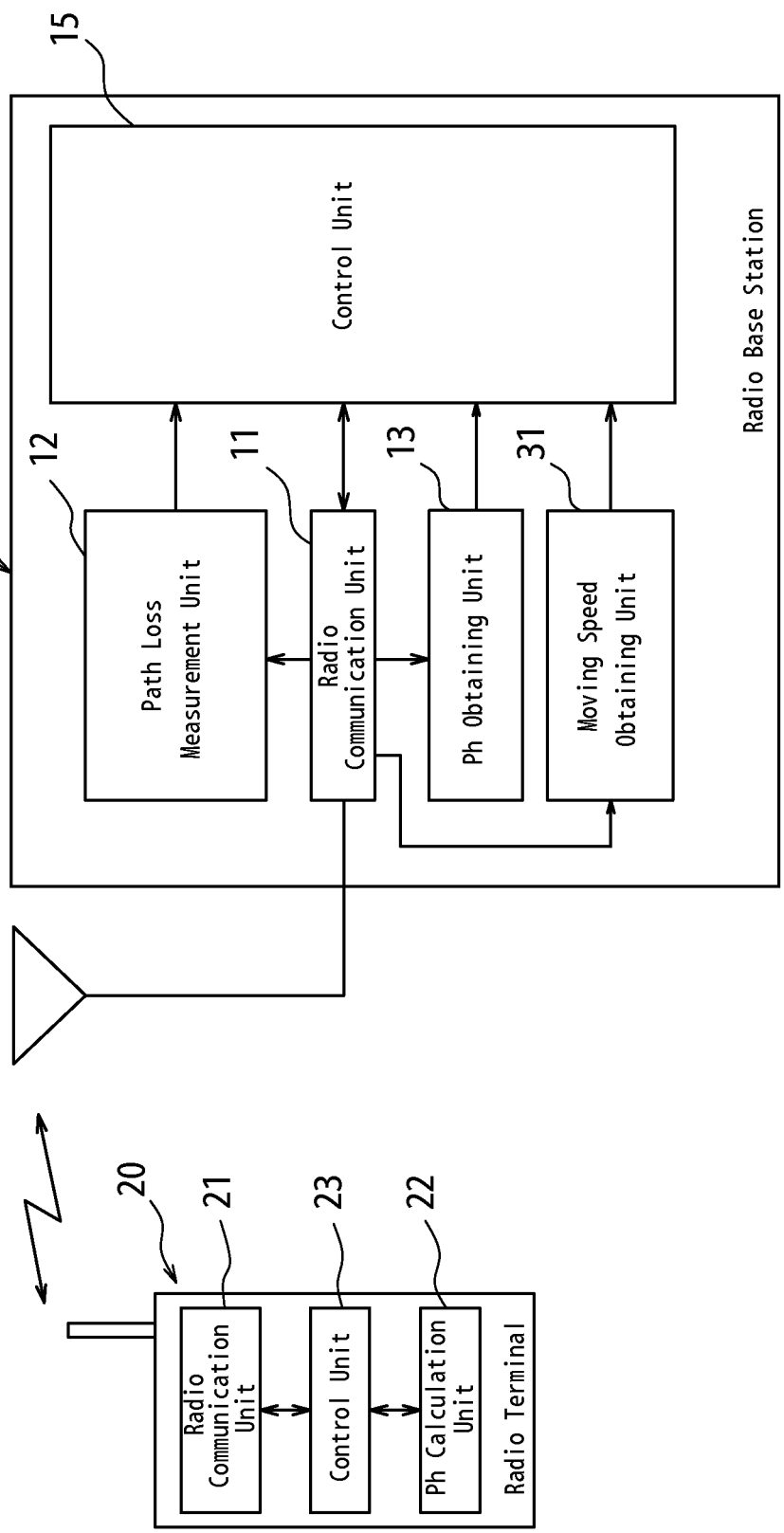
FIG. 5 is a diagram illustrating a schematic configuration of a radio communication system having a radio base station according to a third embodiment of the present invention.

FIG. 5 is a diagram illustrating a schematic configuration of a radio communication system having a radio base station according to a third embodiment of the present invention. A radio base station 30 according to the present embodiment has the same configuration as the radio base station 10 of the radio communication system shown in FIG. 1, except for having a moving speed obtaining unit 31 instead of the communication type information obtaining unit 14.

The moving speed obtaining unit 31 obtains a moving speed of each of the radio terminals 20. The moving speed of each of the radio terminals 20 is obtained by, for example, periodically obtaining a power value of the received signal from each of the radio terminals 20 and monitoring changes in a transmission path. Then, the moving speed obtaining unit 31 determines whether the moving speed obtained is equal to or over a predetermined threshold and provides a result of determination to the control unit 15.

In accordance with the result of determination by the moving speed obtaining unit 31, the control unit 15, for example, sets a radio resource allocation reference Phref to a high value for the radio terminals 20 with the moving speed equal to or over the predetermined threshold and sets the radio resource allocation reference Phref to a low value for the radio terminals 20 with the moving speed under the predetermined threshold. It is also possible that the control unit 15 determines whether the moving speed is equal to or over the predetermined threshold by obtaining moving speed information from the moving speed obtaining unit 31.

In addition, the control unit 15, at predetermined time intervals, controls (schedules) allocation of the radio resource blocks to a plurality of radio terminals 20 based on the path loss measured by the path loss measurement unit 12, the difference information Ph obtained by the Ph obtaining unit 13 and the radio resource allocation reference Phref set in accordance with the moving speed of the radio terminals 20. Then, the control unit 15 transmits a result of such scheduling to corresponding radio terminals 20 via the radio communication unit 11. Other configurations of the radio base station 30 is the same as the radio base station 10 shown in FIG. 1, thus descriptions thereof are omitted. Also, the radio terminals 20 are the same as those in FIG. 1, thus descriptions thereof are omitted.

The radio base station 30, similarly to the above embodiments, may have a single CPU (Central Processing Unit) to implement the path loss measurement unit 12, the Ph obtaining unit 13, the moving speed obtaining unit 31 and the control unit 15. Alternatively, the radio base station 30 may have a plurality of CPUs to assign functions of the path loss measurement unit 12, the Ph obtaining unit 13, the moving speed obtaining unit 31 and the control unit 15.

Figure 6:
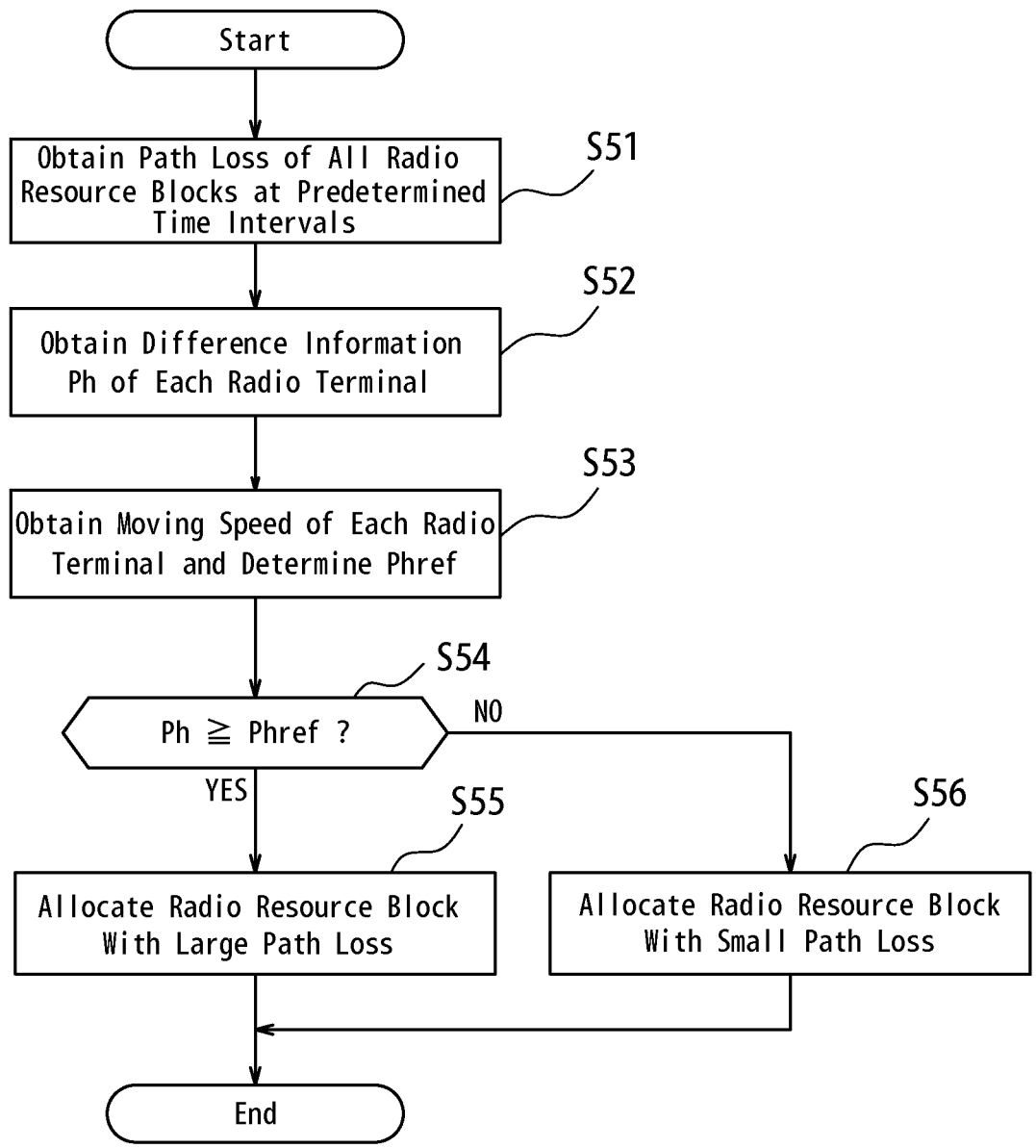
FIG. 6 is a flowchart illustrating a scheduling operation to allocate the radio resource blocks by the radio base station shown in FIG. 5.

FIG. 6 is a flowchart illustrating a scheduling operation to allocate the radio resource blocks by the radio base station 30 according to the present embodiment. The control unit 15 obtains path losses of all of the radio resource blocks from the path loss measurement unit 12 at the predetermined time intervals (step S51). In addition, the control unit 15 obtains the difference information Ph of each of the radio terminals 20 from the Ph obtaining unit 13 (step S52). Also, the control unit 15 obtains the moving speed (result of determination) of each of the radio terminals 20 from the moving speed obtaining unit 31 and determines the radio resource allocation reference Phref (step S53). Then, the control unit 15 compares the difference information Ph obtained from the Ph obtaining unit 13 and the radio resource allocation reference Phref determined based on the moving speed of each of the radio terminals 20 obtained from the moving speed obtaining unit 31 (step S54).

If Ph≥Phref as a result, since this radio terminal 20 has room to increase transmit power, the control unit 15 schedules allocation of radio resource blocks such that the radio terminal 20 is allocated a radio resource block with a large path loss preferentially (step S55). Then, the control unit 15 transmits a result of such scheduling to the corresponding radio terminal 20. In contrast, if Ph<Phref, since the radio terminal 20 has no room to increase transmit power, the control unit 15 schedules allocation of radio resource blocks such that the radio terminal 20 is allocated a radio resource block with a small path loss preferentially (step S56). Then, the control unit 15 transmits a result of such scheduling to the corresponding radio terminal 20.

As described above, the control unit 15, at predetermined time intervals, schedules radio resource blocks allocated to respective radio terminals 20 in accordance with the radio conditions of the radio resource blocks varying every second, based on the radio condition of each of the radio resource blocks and the moving speed and the difference information Ph of each of the radio terminals.

A shown in FIG. 3, allocation of the radio resource blocks to a plurality of radio terminals denoted by the user 1 to the user n is changed based on the radio condition of each of the radio resource blocks, the moving speed and the difference information Ph of each of the radio terminals at the processing unit time (predetermined time interval) in series. It is appreciated that, as described with reference to FIG. 3, it may schedule to allocate a plurality of radio resource blocks to one radio terminal if a small number of radio terminals are connected.

As described above, the radio communication system having the radio base station 30 according to the present embodiment sets the radio resource allocation reference Phref based on the moving speed of each of the radio terminals 20. For example, the Phref is set high for the radio terminals 20 with the moving speed equal to or over the predetermined threshold, whereas the Phref is set low for the radio terminals 20 with the moving speed under the predetermined threshold. Therefore, it increases a probability to be determined that, in comparison between the difference information Ph and the Phref, the radio terminal 20 moving at a high speed has the Phref larger than the difference information Ph. As a result, it is determined that the radio terminal 20 does not have room to increase transmit power and a radio resource block with a small path loss, i.e., the radio resource block in a good radio condition is preferentially allocated to the radio terminal 20. Thereby, it is possible to assuredly keep the radio link of the radio terminal 20.

In addition, the radio resource block with a large path loss, i.e., the radio resource block in a poor radio condition is preferentially allocated to the radio terminal 20 having the difference information Ph equal to or over the radio resource allocation reference Phref. However, having room to increase transmit power, the radio terminal 20 can maintain the radio link by suitably controlling the transmit power. Accordingly, it is possible to suitably control the transmit power of each of the radio terminals 20 and to keep a stable radio link between each of the radio terminals 20 and the radio base station 30. In addition, since the radio base station 30 can know path losses of all of the radio resource blocks at predetermined time intervals, it can control a downlink modulation method, beam forming of an antenna and the like, following temporal changes in the radio condition.

Fourth Embodiment

Figure 7:
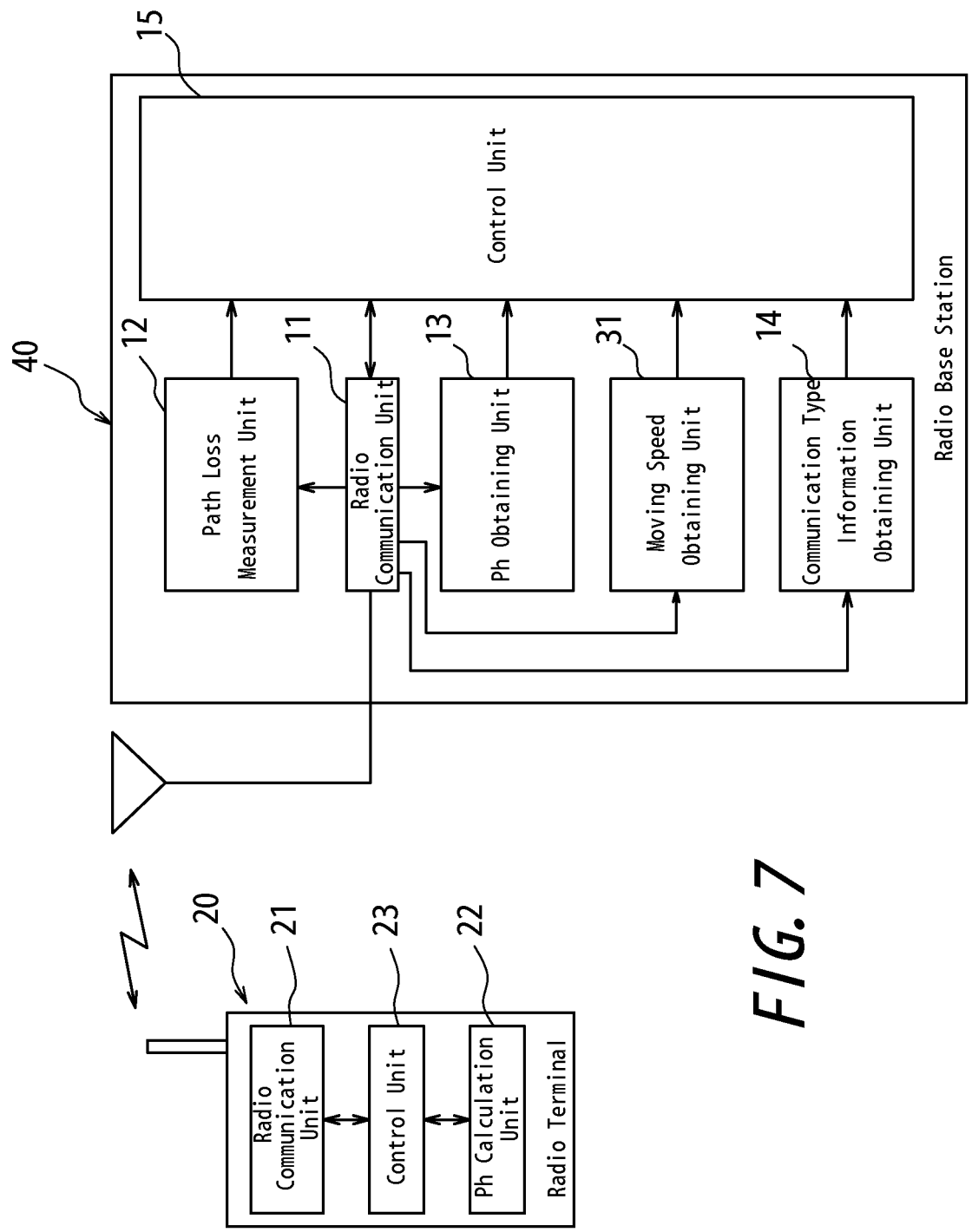
FIG. 7 is a diagram illustrating a schematic figuration of a radio communication system having a radio base station according to a fourth embodiment of the present invention.

FIG. 7 is a diagram illustrating a schematic configuration of a radio communication system having a radio base station according to a fourth embodiment of the present invention. A radio base station 40 according to the present embodiment further includes a communication type information obtaining unit 14 shown in FIG. 1 in addition to the configuration of the radio base station 30 shown in FIG. 5. The communication type information obtaining unit 14 obtains the communication type information by identifying the type of the communication with each of the radio terminals 20 and provides the control unit 15 with the communication type information. According to the present embodiment, in the same manner as the first and second embodiments, the communication type information obtaining unit 14 classifies the communication type information into the communication type (T1) requiring the real-time property such as for example voice communication, streaming and the like and the communication type (T2) for other data communications such as browsing and the like, and provides the control unit 15 with the communication type information.

At predetermined time intervals, the control unit 15 controls (schedules) allocation of the radio resource blocks to a plurality of radio terminals 20 based on the path loss measured by the path loss measurement unit 12, the difference information Ph obtained by the Ph obtaining unit 13, the moving speed obtained by the moving speed obtaining unit 31 and the communication type information obtained by the communication type information obtaining unit 14. The control unit 15 then transmits a result of such scheduling to the corresponding radio terminals 20 via the radio communication unit 11. Other configurations and operations are the same as those in FIG. 5.

Figure 8:
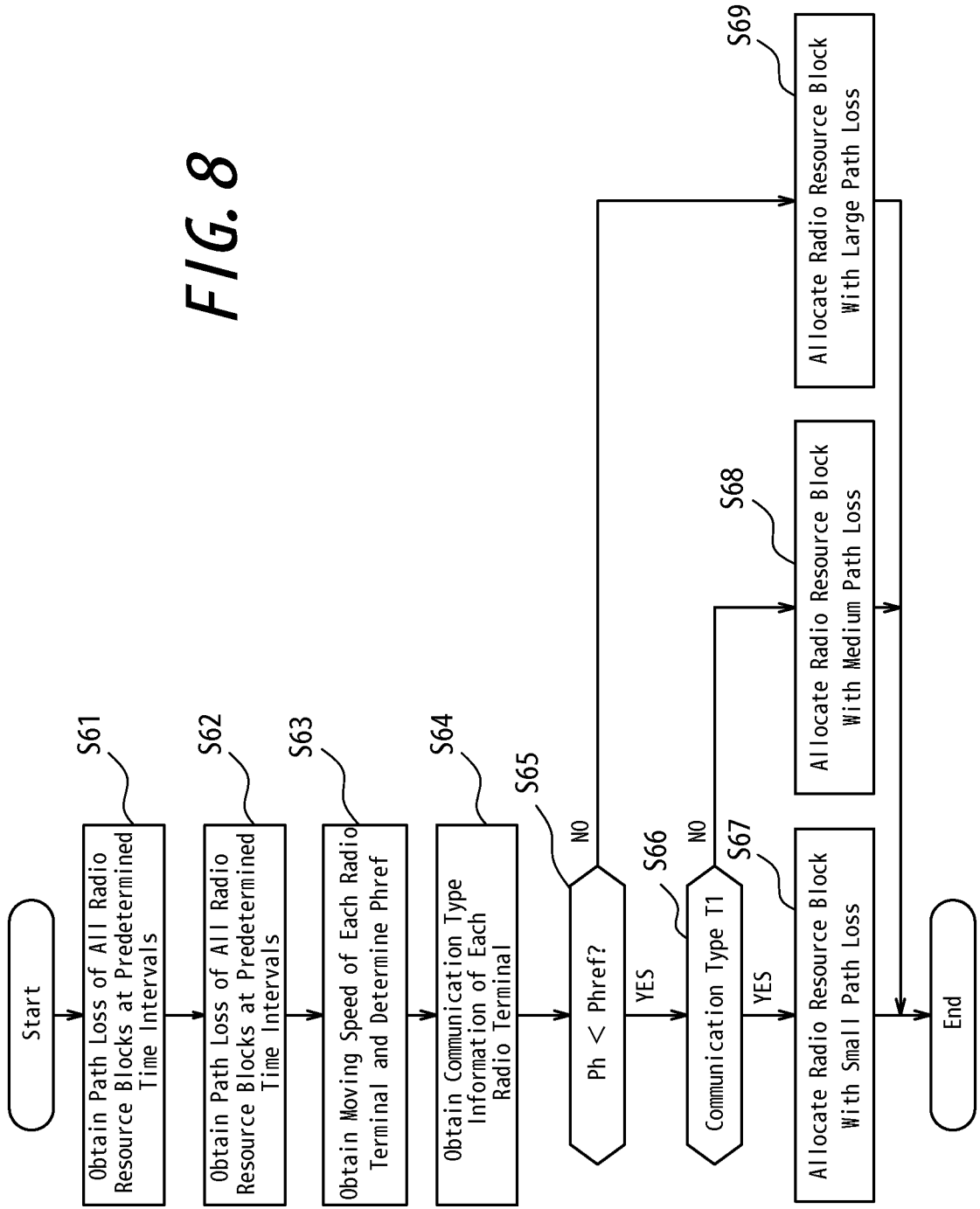
FIG. 8 is a flowchart illustrating a scheduling operation to allocate the radio resource blocks by the radio base station according to the fourth embodiment of the present invention.

FIG. 8 is a flowchart illustrating a scheduling operation to allocate the radio resource blocks by the radio base station 40 according to the present embodiment. In the same manner as the above embodiments, the control unit 15 obtains, at predetermined time intervals, path losses of all of the radio resource blocks from the path loss measurement unit 12 (step S61) and the difference information Ph of each of the radio terminals 20 from the Ph obtaining unit 13 (step S62). In addition, the control unit 15 obtains the moving speed (result of determination) of each of the radio terminals 20 from the moving speed obtaining unit 31 and determines the radio resource allocation reference Phref (step S63). Further, the control unit 15 obtains the communication type information of each of the radio terminals 20 from the communication type information obtaining unit 14 at predetermined time intervals (step S64).

Then, the control unit 15 compares the difference information Ph and the radio resource allocation reference Phref set in accordance with the moving speed obtained by the moving speed obtaining unit 31, for each of the radio terminals 20 (step S65). If Ph<Phref as a result, since this radio terminal 20 does not have room to increase transmit power, the control unit 15 determines whether the communication type of the radio terminal 20 is T1 which requires the real-time property (step S66).

If the communication type is T1 as a result, the control unit 15 schedules allocation of radio resource blocks such that the radio terminal 20 is allocated a radio resource block with a small path loss preferentially (step S67) and then transmits a result of such scheduling to the corresponding radio terminal 20.

If the communication type is T2, which does not require the real-time property, the control unit 15 schedules allocation of radio resource blocks such that the radio terminal 20 is allocated a radio resource block with a medium path loss preferentially (step S68). Then, the control unit 15 transmits a result of such scheduling to the corresponding radio terminal 20.

In contrast, if Ph≥Phref at step S65, since the radio terminal 20 has room to increase transmit power, the control unit 15 schedules allocation of radio resource blocks such that the radio terminal 20 is allocated a radio resource block with a large path loss preferentially in the same manner as the third embodiment (step S69). Then, the control unit 15 transmits a result of such scheduling to the corresponding radio terminal 20.

As described above, the control unit 15 schedules the resource blocks allocated to respective radio terminals 20 at predetermined time intervals in accordance with the radio condition of each of the radio resource blocks varying every second, based on the radio condition of each of the radio resource blocks and the difference information Ph, the moving speed and the communication type of each of the radio terminals.

According to the radio communication system having the radio base station 40 of the present embodiment, a radio resource block with a small path loss, i.e., the radio resource block in a good radio condition is preferentially allocated to the radio terminal 20 having the difference information Ph under the radio resource allocation reference Phref, which is set based on the moving speed of each of the radio terminals 20, and in communication of the communication type T1 which requires the real-time property. Accordingly, it enables not only to achieve the same effect as the third embodiment but also to more assuredly keep a stable radio link of the communication of the communication type T1 which requires the real-time property, thereby ensuring QoS (Quality of Service) of the communication type T1.

It is also possible to configure the control unit 15 to determine, if Ph≥Phref at step S65 in FIG. 8, whether the communication type is T1, and if the communication type is T1, to preferentially allocate a radio resource block with a small path loss, and if the communication type is T2, to preferentially allocate a radio resource block with a large path loss.

Further, it is also possible for the control unit 15 to carry out the steps S65 and S66 in FIG. 8 in an opposite order so as to compare the Ph and the Phref after determining the communication type. That is, the control unit 15 may determine at step S65 whether the communication type of the radio terminal 20 is T1 which requires the real-time property and, at step S66, compare the difference information Ph and the radio resource allocation reference Phref, which is set based on the moving speed obtained by the moving speed obtaining unit 31, for each of the radio terminals 20.

In this case, it is also possible to configure the control unit 15, if it is determined that the communication type is not T1, to compare the difference information Ph and the radio resource allocation reference Phref, and if Ph≥Phref, to allocate a radio resource block with a large path loss, and if Ph<Phref, to preferentially allocate a radio resource block with a small path loss.

Fifth Embodiment

According to a radio base station of a fifth embodiment of the present invention, the control unit 15 in the radio base station 40 shown in FIG. 7 classifies a plurality of radio resource blocks into a plurality of radio resource groups based on the path loss on each of the radio resource blocks obtained and schedules allocation of the radio resource blocks based on a result of comparison between the difference information Ph and the radio resource allocation reference Phref and the communication type of each of the radio terminals 20.

FIG. 9 is a flowchart illustrating a scheduling operation to allocate the radio resource blocks by the radio base station 40 according to the fifth embodiment of the present invention. The control unit 15 obtains path losses of all of the radio resource blocks from the path loss measurement unit 12 at predetermined time intervals (step S71). Then, the control unit 15 classifies the resource blocks into a plurality of radio resource groups based on a comparison between the path loss on each of the resource blocks obtained and a predetermined threshold of the path loss. According to the present embodiment, the radio resource blocks are classified into two radio resource groups by the threshold of the path loss: group A with a path loss under the threshold, i.e., being in a good radio condition, and group B with a path loss equal to or over the threshold, i.e., being in a relatively poor radio condition (step S72).

In addition, the control unit 15 obtains the moving speed (result of determination) of each of the radio terminals 20 from the moving speed obtaining unit 31 and determines the radio resource allocation reference Phref for each of the radio terminals 20 (step S73). Then, the control unit 15 obtains, at predetermined time intervals, the difference information Ph of each of the radio terminals 20 from the Ph obtaining unit 13 (step S74) and the communication type information of each of the radio terminals 20 from the communication type information obtaining unit 14 (step S75).

Then, the control unit 15, for each of the radio terminals 20, compares the difference information Ph and obtains the radio resource allocation reference Phref set based on the moving speed obtained by the moving speed obtaining unit 31 (step S76). If Ph<Phref as a result, since this radio terminal 20 does not have room to increase transmit power, the control unit 15 determines whether the communication type of this radio terminal 20 is T1 which requires the real-time property (step S77).

If the communication type is T1 as a result, the control unit 15 schedules allocation of radio resource blocks such that the radio terminal 20 is allocated a radio resource block with a smaller path loss preferentially among radio resource blocks in the group A (step S78). Then, the control unit 15 transmits a result of such scheduling to the corresponding radio terminal 20.

If the communication type is T2, which does not require the real-time property, the control unit 15 schedules allocation of radio resource blocks such that the radio terminal 20 is allocated a radio resource block with a larger path loss among radio resource blocks in the group A (step S79). Then, the control unit 15 transmits a result of such scheduling to the corresponding radio terminal 20.

In contrast, if Ph≥Phref at step S76, since this radio terminal 20 has room to increase transmit power, the control unit 15 determines whether the communication type is T1 (step S80). If the communication type is T1 as a result, the control unit 15 schedules allocation of radio resource blocks such that the radio terminal 20 is allocated a radio resource block with a smaller path loss preferentially among radio resource blocks in the group B (step S81). Then, the control unit 15 transmits a result of such scheduling to the corresponding radio terminal 20.

If the communication type is T2, the control unit 15 schedules allocation of radio resource blocks such that the radio terminal 20 is allocated a radio resource block with a larger path loss among radio resource blocks in the group B (step S82). Then, the control unit 15 transmits a result of such scheduling to the corresponding radio terminal 20.

As described above, the control unit 15 schedules the radio resource blocks allocated to respective radio terminals 20 at predetermined time intervals in accordance with the radio condition of each of the radio resource blocks varying every second, based on the radio condition of each of the radio resource blocks and the difference information Ph, the moving speed and the communication type of each of the radio terminals.

Such a scheduling operation selects a radio resource block with a large path loss, i.e., the radio resource block in the group B in a poor radio condition for the radio terminal 20 having the difference information Ph equal to or over the radio resource allocation reference Phref set based on the moving speed of each of the radio terminals 20. However, having room to increase transmit power, the radio terminal 20 can keep the radio link by suitably controlling the transmit power. Moreover, even in this case, since the radio terminals 20 in communication of the communication type T1 which requires the real-time property is allocated a radio resource block with a smaller path loss, i.e., the radio resource block in a better radio condition in the group B preferentially, it more assuredly ensure QoS of the communication type T1.

In this way, according to the radio communication system having the radio base station 40 of the present embodiment, it is possible to suitably control the transmit power of each of the radio terminals 20, as well as keeping a stable radio link between each of the radio terminals 20 and the radio base station 40. In addition, since the radio base station 40 can know path losses of all of the radio resource blocks at predetermined time intervals, it can control the downlink modulation method, beam forming of an antenna and the like, following temporal changes in the radio condition.

Further, it is also possible for the control unit 15 to carry out the steps S76, S77 and S80 in FIG. 9 in an opposite order so as to compare the Ph and the Phref after determining the communication type. That is, the control unit 15 may determine at step S76 whether the communication type of the radio terminal 20 is T1 which requires the real-time property and, at each of step S77 and step S80, compare the difference information Ph and the radio resource allocation reference Phref, which is set based on the moving speed obtained by the moving speed obtaining unit 31, for each of the radio terminals 20. If there is a radio terminal 20 in communication of the communication type T1 and satisfying Ph≥Phref as a result, the control unit 15 allocates a radio resource with a larger path loss in the group A to the communication terminal 20.

It is to be understood that the present invention is not limited to the above embodiments but may be modified or varied in a multiple of manners. For example, it is possible to set a plurality of thresholds for the path loss and to classify the radio resource blocks into three or more radio resource groups. Likewise, it is also possible to classify the communication type into not only two but also three or more types. With three or more radio resource groups and three or more communication types for classification, it allows for more suitable and effective scheduling radio resource blocks to each of the radio terminals based on the difference information Ph, the communication type and the moving speed of each of the radio terminals.

In addition, it is also possible in the third, fourth and fifth embodiments to arrange such that the moving speed obtaining unit of the radio base station obtains location information and time information of the radio terminal obtained by GPS or the like mounted therein at predetermined time intervals and calculates the moving speed of the radio terminal based on those information.

According to the present invention, moreover, it is also possible to arrange not only such that the radio base station carries out processing to obtain the moving speed of the radio terminal as described above but also such that the radio terminal itself detects the moving speed thereof based on the location information at predetermined time intervals obtained by GPS or the like and transmits the moving speed, together with the difference information Ph of the transmit power, to the radio base station.

The present invention is widely applicable not only to LTE but also to radio communication systems, such as WiMAX (Worldwide Interoperability for Microwave Access), UMB (Ultra Mobile Broadband), next generation PHS (Personal Handy-phone System), IMT-Advanced and the like, for performing radio communication by allocating a different radio resource to each of a plurality of radio terminals.

REFERENCE SIGNS LIST

10 radio base station
11 radio communication unit
12 path loss measurement unit
13 Ph obtaining unit
14 communication type information obtaining unit
15 control unit
21 radio terminal
21 radio communication unit
22 Ph calculation unit
23 control unit
30 radio base station
31 moving speed obtaining unit
40 radio base station

The invention claimed is:

1. A radio base station for performing radio communication by allocating a different radio resource to each of a plurality of radio terminals, comprising:
    a measurement unit for measuring a path loss on the radio resource allocated to each of the plurality of radio terminals at predetermined time intervals;
    a difference information obtaining unit for obtaining difference information between maximum transmit power and current transmit power, transmitted from each of the plurality of radio terminals;
    a communication type information obtaining unit for obtaining communication type information indicative of a communication type of each of the plurality of radio terminals; and
    a control unit for classifying the radio resources into at least two radio resource groups based on the path loss on each of the radio resources measured by the measurement unit, and for controlling to allocate a radio resource in a corresponding radio resource group to each of the plurality of radio terminals based on the difference information obtained by the difference information obtaining unit and the communication type information obtained by the communication type information obtaining unit.

2. The radio base station according to claim 1, wherein the control unit classifies the radio resources into at least two radio resource groups based on a comparison between the path loss on each of the radio resources measured by the measurement unit and a predetermined threshold.

3. The radio base station according to claim 1, wherein the control unit, after determining the radio resource group to allocate a radio resource to each of the radio terminals, based on the difference information obtained by the difference information obtaining unit, controls to allocate a radio resource with a relatively large path loss or a radio resource with a relatively small path loss measured by the measurement unit in the radio resource group determined, based on the communication type information obtained by the communication type information obtaining unit.

4. The radio base station according to claim 1, wherein the control unit, after determining the radio resource group to allocate a radio resource to each of the radio terminal, based on the communication type information obtained by the communication type information obtaining unit, controls to allocate a radio resource with a relatively large path loss or a radio resource with a relatively small path loss measured by the measurement unit in the radio resource group determined, based on the difference information obtained by the difference information obtaining unit.

5. A radio base station for performing radio communication by allocating a different radio resource to each of a plurality of radio terminals, comprising:
 a measurement unit for measuring a path loss on the radio resource allocated to each of the plurality of radio terminals at predetermined time intervals;
 a difference information obtaining unit for obtaining difference information between maximum transmit power and current transmit power, transmitted from each of the plurality of radio terminals;
 a moving speed obtaining unit for obtaining a moving speed of each of the plurality of radio terminals; and
 a control unit for setting a radio resource allocation reference in accordance with the moving speed obtained by the moving speed obtaining unit for each of the radio terminals, and for controlling allocation of the radio resource to each of the plurality of radio terminals based on the radio resource allocation reference, the path loss measured by the measurement unit and the difference information obtained by the difference information obtaining unit.

6. The radio base station according to claim 5, wherein the moving speed obtaining unit obtains the moving speed of the radio terminal based on a received signal from the radio terminal.

7. The radio base station according to claim 5, wherein the control unit allocates a radio resource with a relatively small path loss measured by the measurement unit to the radio terminal having the difference information obtained by the difference information obtaining unit under a first threshold indicative of the radio resource allocation reference set for each of the radio terminals, whereas the control unit allocates a radio resource with a relatively large path loss measured by the measurement unit to the radio terminal having the difference information obtained by the difference information obtained unit equal to or over the first threshold indicative of the radio resource allocation reference set for each of the radio terminals.

8. The radio base station according to claim 5, further comprising a communication type information obtaining unit for obtaining communication type information indicative of a communication type of each of the plurality of radio terminals, wherein
 the control unit controls allocation of the radio resource to each of the plurality of radio terminals based on the path loss measured by the measurement unit, the difference information obtained by the difference information obtaining unit, the radio resource allocation reference set for each of the radio terminals, and the communication type information obtained by the communication type information obtaining unit.

9. The radio base station according to claim 8, wherein the control unit classifies the radio resources into at least two radio resource groups based on the path loss on each of the radio resources measured by the measurement unit, and controls to allocate a radio resource in a corresponding radio resource group to each of the plurality of radio terminals based on the radio resource allocation reference set for each of the radio terminals, the difference information obtained by the difference information obtaining unit, and the communication type information obtained by the communication type information obtaining unit.

10. The radio base station according to claim 9, wherein the control unit classifies the radio resources into at least two radio resource groups based on a comparison between the path loss on each of the radio resources measured by the measurement unit and a predetermined second threshold.

11. The radio base station according to claim 9, wherein the control unit, after determining the radio resource group to allocate a radio resource to each of the radio terminals, based on the radio resource allocation reference set for each of the radio terminals and the difference information obtained by the difference information obtaining unit, controls to allocate a radio resource with a relatively large path loss or a radio resource with a relatively small path loss measured by the measurement unit in the radio resource group determined, based on the communication type information obtained by the communication type information obtaining unit.

12. The radio base station according to claim 9, wherein the control unit, after determining the radio resource group to allocate a radio resource to each of the radio terminals, based on the communication type information obtained by the communication type information obtaining unit, controls to allocate a radio resource with a relatively large path loss or a radio resource with a relatively small path loss measured by the measurement unit in the radio resource group determined, based on the radio resource allocation reference set for each of the radio terminals and the difference information obtained by the difference information obtaining unit.

13. A radio resource allocation method of a radio base station for performing radio communication by allocating a different radio resource to each of a plurality of radio terminals, comprising the steps of:
 measuring a path loss on the radio resource allocated to each of the plurality of radio terminals at predetermined time intervals;
 obtaining difference information between maximum transmit power and current transmit power, transmitted from each of the plurality of radio terminals;
 obtaining communication type information indicative of a communication type of each of the plurality of radio terminals; and
 classifying the radio resources into at least two radio resource groups based on the path loss on each of the radio resources measured, and controlling to allocate a radio resource in a corresponding radio resource group to each of the plurality of radio terminals based on the difference information and the communication type information obtained.

14. A radio resource allocation method of a radio base station for performing radio communication by allocating a different radio resource to each of a plurality of radio terminals, comprising the steps of:
 measuring a path loss on the radio resource allocated to each of the plurality of radio terminals at predetermined time intervals;
 obtaining difference information between maximum transmit power and current transmit power, transmitted from each of the plurality of radio terminals;
 obtaining a moving speed of each of the plurality of radio terminals; and setting a radio resource allocation reference in accordance with the moving speed obtained by the moving speed obtaining unit for each of the radio terminals, and controlling allocation of the radio resource to each of the plurality of radio terminals based on the radio resource allocation reference, the path loss measured by the measurement unit and the difference information obtained by the difference information obtaining unit.

15. A radio communication system comprising a radio base station for performing radio communication with a plurality of radio terminals by allocating a different radio resource to each of the plurality of radio terminals, wherein
each of the plurality of radio terminals comprises:
a calculation unit for calculating a difference between current transmit power and maximum transmit power the radio terminal can transmit and for outputting difference information;
a transmission unit for transmitting the difference information output from the calculation unit to the radio base station, and
the radio base station comprises:
a measurement unit for measuring a path loss on the radio resources allocated to each of the plurality of radio terminals at predetermined time intervals;
a difference information obtaining unit for obtaining the difference information between maximum transmit power and current transmit power, transmitted from each of the plurality of radio terminals;
a communication type information obtaining unit for obtaining communication type information indicative of a communication type of each of the plurality of radio terminals; and
a control unit for classifying the radio resources into at least two radio resource groups based on the path loss on each of the radio resources measured by the measurement unit, and for controlling to allocate a radio resource in a corresponding radio resource group to each of the plurality of radio terminals based on the difference information obtained by the difference information obtaining unit and the communication type information obtained by the communication type information obtaining unit.

16. A radio communication system comprising a radio base station for performing radio communication with a plurality of radio terminals by allocating a different radio resource to each of the plurality of radio terminals, wherein
each of the plurality of radio terminals comprises:
a calculation unit for calculating a difference between current transmit power and maximum transmit power the radio terminal can transmit and for outputting difference information;
a transmission unit for transmitting the difference information output from the calculation unit to the radio base station, and
the radio base station comprises:
a measurement unit for measuring a path loss on each of the radio resource allocated to each of the plurality of radio terminals at predetermined time intervals;
a difference information obtaining unit for obtaining the difference information between maximum transmit power and current transmit power, transmitted from each of the plurality of radio terminals;
a moving speed obtaining unit for obtaining a moving speed of each of the plurality of radio terminals; and
a control unit for setting a radio resource allocation reference in accordance with the moving speed obtained by the moving speed obtaining unit for each of the radio terminals, and for controlling allocation of the radio resource to each of the plurality of radio terminals based on the radio resource allocation reference, the path loss measured by the measurement unit and the difference information obtained by the difference information obtaining unit.

\* \* \* \* \*